(12) United States Patent
Duncan, Jr.

(10) Patent No.: US 7,044,711 B2
(45) Date of Patent: May 16, 2006

(54) HELICAL DEVICE FOR CONVERSION OF FLUID POTENTIAL ENERGY TO MECHANICAL ENERGY

(76) Inventor: Floyed Jeffries Duncan, Jr., 2090 Wellington Dr., West Linn, OR (US) 97068

( * ) Notice: Subject to any disclaimer, the term of this patent is extended or adjusted under 35 U.S.C. 154(b) by 20 days.

(21) Appl. No.: 10/605,512

(22) Filed: Oct. 3, 2003

(65) Prior Publication Data

US 2005/0074322 A1    Apr. 7, 2005

(51) Int. Cl.
*F03B 7/00* (2006.01)
(52) U.S. Cl. .................. 415/906; 415/908; 416/198 R
(58) Field of Classification Search ............... 415/2–5, 415/72–75, 176–177, 13.1, 91, 906, 908; 416/176–177, 198 R, 189; 290/42–44, 52–54; 43/4–7, 26.1, 56–57
See application file for complete search history.

(56) References Cited

U.S. PATENT DOCUMENTS

| 928,782 | A | * | 7/1909 | Morrison | 416/177 |
| 4,218,175 | A | * | 8/1980 | Carpenter | 415/219.1 |
| 4,272,685 | A | * | 6/1981 | Toyama | 290/52 |
| 4,325,354 | A | * | 4/1982 | Fuchs | 126/247 |
| 4,512,716 | A | * | 4/1985 | McHenry et al. | 415/205 |
| 4,524,285 | A | * | 6/1985 | Rauch | 290/43 |
| 4,849,647 | A | * | 7/1989 | McKenzie | 290/54 |
| 5,167,483 | A | * | 12/1992 | Gardiner | 415/3.1 |
| 5,592,816 | A | * | 1/1997 | Williams | 60/398 |
| 6,327,994 | B1 | * | 12/2001 | Labrador | 114/382 |
| 6,729,840 | B1 | * | 5/2004 | Williams | 415/3.1 |

* cited by examiner

Primary Examiner—Edward K. Look
Assistant Examiner—Igor Kershteyn (57) ABSTRACT

This device utilizes a helical baffle inside of generally cylindrical housing to convert potential energy of a fluid to kinetic and/or mechanical energy that can be captured for productive use. The housing's axis is positioned at an angle from horizontal and the fluid is entered into the high end of the device. The helical baffles convert the gravity-induced pressure of the water into a torque moment around the axis of the cylinder causing the helix to rotate. Mechanical energy is then extracted from this rotation and utilized in a productive manner, typically by driving an electrical generator. The implementation of this concept in hydroelectric applications provides substantial benefits over traditional turbine generation in efficiency and reducing environmental concerns.

14 Claims, 14 Drawing Sheets

Perspective view of AquaHelix device

Perspective view of AquaHelix device

Figure 14

HELICAL DEVICE FOR CONVERSION OF FLUID POTENTIAL ENERGY TO MECHANICAL ENERGY

BACKGROUND OF INVENTION

1. Field of the Invention

The field of the invention is that of methods and apparatus for converting the energy of fluid mass at elevation into kinetic energy in the process of conveying the fluid to a lower elevation. One specific benefit of which would be the subsequent generation of electricity from said kinetic energy such as that accomplished in hydroelectric power generation.

2. Description of Related Art

Of commercial high capacity renewable energy sources, water has the longest history, is the most easily harnessed and has the best potential for an environmentally friendly source of energy. The invention is intended to provide a preferred device for use in hydroelectric mechanisms for the conversion of potential energy in the water to mechanical energy. This energy would then be used to power electrical generation equipment or put to other productive use. The alternative methods to accomplish this that are currently in place include but are not limited to: turbines, water wheels, hydraulic ram pumps, wave and tidal capture and other mechanisms. Each of these has inherent negatives, many of which are addressed in the AquaHelix, the mechanism herein described. The device herein has the potential for retrofit in existing hydroelectric dams and well as in new construction and smaller personal installations. The simplicity of this device may make the cost and effort of operation appealing in situations otherwise unfeasible for conventional technologies Much of the prior art that has been identified in a patent search has embodied numerous variations of using a blade of some manner (turbine, impeller, vane or wing) similar to a fan, whereby the inertial force of a fluid or gas in motion is impinging against the blade or the Bernoulli effect of passing over the blade results in a force and resulting in motion. The significant differentiation of the device proposed in this patent is that the helical baffles serve only to contain the fluid and no fan-like or wing like effect is present in the device. The development of power is effected from the conversion of elevational potential energy to kinetic mechanical energy as a mass of fluid is lowered from one elevation to a lower elevation. The movement of fluid in the invention is positive displacement in nature as a contained volume of fluid in a baffle area is constrained and lowered as a batch. The small relative amount kinetic energy associated with the gradual lowering of the batch of water is inconsequential to the conversion and capture of the potential energy and in fact there is no mechanism present in the invention to attempt to capture the kinetic component of the energy contained in the fluid. In the evaluation of the numerous prior arts detailed below the reliance on the kinetic energy of a moving stream of fluid is a significant distinction which is described above and is referenced in the subsequent details as "reliance on conversion of kinetic energy"

U.S. Pat. No. 6,327,994 Dec. 11, 2001—Labrador

This amazing piece encompasses a mass of 127 related claims all of which are dependent claims to Claim number 1 or are dependent to another claim which in turn is dependent on claim one. Claim one states in part to " . . . imped and to drive moving fluids/air in order to pump/ compress and to convert . . . " The proposed device described in the invention application does not purport to extract energy from moving fluids or air and therefore is distinct and cannot be in conflict with the claims of 994.

U.S. Pat. No. 928,782 Jul. 20, 1909—Morrison

Unlike the device proposed in the invention, this device necessitates being placed "in a water course" and deriving energy from the impinging of moving water on an "impact area for causing rotation of the cylinder." This is one of the devices that as described above, "relies on the conversion of kinetic energy" of flowing water, similar to that of putting an impeller in a moving stream. This is significantly distinct from the mechanism in the invention as previously discussed.

U.S. Pat. No. 4,218,175 Aug. 10, 1980—Carpenter

This device describes a wind turbine and does not apply to fluids, in addition it "relies on the conversion of kinetic energy" from the medium, in this case a gas which is materially different from the mechanism described in the invention.

U.S. Pat. No. 4,272,685 Jun. 9, 1981—Toyama

This patent describes a variation on a traditional fluid turbine where by fluid in motion is converted by turbines to mechanical energy. Fluid is taken from the "bottom of the dam" and is subsequently converted. This the invention device is not infringing as it does not propose nor would it be possible to utilize an off take at the bottom of a dam and the 685 patent "relies on the conversion of kinetic energy" as previously discussed.

U.S. Pat. No. 4,325,354 Apr. 20, 1982—Fuchs

This patent describes a variable transmission device intended to optimize the speed of a wind driven blade for maximum efficiency. It is non applicable to the invention device proposed as the invention is a positive displacement device and the ratio of fluid flow to rotational speed is not subject to slippage or optimization in the manor described in 354.

U.S. Pat. No. 4,512,716, Apr. 23, 1985—McHenry et al.

This patent describes a device to optimize the radial velocity profile of a gas flow into a turbine to optimize efficiency such that the speed of the gases adjacent to the axis is faster than that approaching the radius. As the device described in the invention does not extract energy from the kinetic energy of motion or pertain to the extraction of energy from gases of any form, it is not subject to infringement of this patent.

Minimum prior art of this nature has been discovered. The concept utilized in typical cement mixer trucks actually has similar characteristics albeit run in a reverse fashion, and for the purpose of mixing in a closed recycled nature rather than for transport from one elevation to another and for energy conversion.

A search of prior art in the area of this invention resulted in the following related but differientiated patents. Substantial differences between claims herein and prior art is described below.

U.S. Pat. No. 6,253,700 covers the use of a helical blade submerged in a fluid flow in an attempt to convert energy. The claims of that patent differ in numerous ways from that covered herein, but most significantly in that the basic concept and design is to convert the kinetic energy of moving fluid to mechanical energy via a foil effect versus the basic design covered herein to extract potential energy from a fluid by a change in elevation into mechanical energy.

U.S. Pat. No. 4,268,226 covered a scheme whereby the internal volume of a tube is changed by a helical constraint around a pliable tube that causes a pumping action when the assembly is subjected to distortion. This patent also differs in substantial ways, the greatest of which is the lack of helical baffles that constrain a fluid.

U.S. Pat. No. 4,465,430 covered a scheme whereby a stationary helix is utilized to impart a swirl motion to fluid prior to entry into a turbine or propeller to improve efficiency of the turbine or propeller. The device claimed herein is not designed to optimize efficiency of a subsequent step such as a turbine or propeller; it is an energy conversion device in its own right.

U.S. Pat. No. 4,871,304 describes a compressor consisting of a spiral grove and blade along the length of a cylinder, the geometry of the device varies along its length such that the fluid is compressed in volume as it moves from input to output. The device claimed herein is not designed to compress fluid, nor does it rely on the relative motion of internal and external rotating bodies or a blade fitted to a helical grove.

U.S. Pat. Nos. 6,253,700 and 6,293,835 describes a plurality of air foil shapes blades to be utilized in conjunction with an ultra low-head fluid in order to extract or impart kinetic energy from or to a fluid or gas. The device claimed herein differs in substantial ways, the most significant of which is the necessity for a material fluid head and lack of the requirement of air foil shapes blades or material kinetic energy in the fluid or gas.

U.S. Pat. No. 6,257,855 describes a compressor consisting of a set of helical rotors which intermesh in order to create a positive displacement pump for creation of pressure or vacuum. The device claimed herein differs in substantial ways, the most significant of which is the lack of necessity for dual intermeshing helical rotors.

U.S. Pat. No. 6,273,673 describes a pump consisting of a helical baffle through which one or more balls are transported resulting in the displacement and transport of the surrounding fluid. The device described herein among numerous differences does not rely on the use of balls in the helical channels.

No other patents or demonstrations of similar technology have been discovered in USPTO searches or during research and development of this patent.

Unmet Opportunity in the Industry

With the recent power shortages, middle eastern oil concerns and national attention to energy costs, this device offers an attractive solution to harnessing more energy from existing and new hydroelectric generation dams and providing a solution for smaller installations for personal use, industrial use or sale back to the power grid under PUC net metering regulations. The device offers a potentially significant improvement in the conversion efficiency, offering more power from existing installations or the same power from fewer installations.

With the growing concern over the regrettable killing of fish and marine animals in hydroelectric turbines, this invention will be particularly attractive. It should dramatically reduce this problem by eliminating the high speed under water blades and the small volumes of "uncleaved" water that pass thru the turbines and well as dramatically reducing the turbulence and velocity that the water and wild life are subjected to in traditional turbine installations.

BRIEF SUMMARY OF THE INVENTION

The device described herein is comprised of a cylinder with an internal helically shaped baffle which produces a series of cavities along the length of the cylinder in the lower half that are capable of containing a fluid. When the device is positioned at an angle from horizontal and a fluid such as water is introduced at the top of the device the resulting forces of the fluid on the helical walls of the cavities creates a torque around the axis of the cylinder. If the cylinder is then allowed to rotate and fluid is continuously introduced at the top, mechanical energy is generated from the lowering of the fluid in the chambers and can be extracted from the rotation of the cylinder for productive use such as in electrical generation.

BRIEF DESCRIPTION OF DRAWINGS

FIG. 7. This Figure portrays the effect of larger radius and helix pitch at the entrance of the device. The use of an enlarged radius or bulb like entrance to the housing as shown in dotted lines on the figure would add additional fluid (B) to the fluid (A) which would be contained in a constant radius housing. This additional fluid (B) being at a higher elevation will raise the center of gravity of the fluid contained in the first baffle area thereby reducing the loss of potential energy as fluid enters the device.

FIG. 8 shows the relative level of the center of gravity of the fluid (B) contained in the lower baffle for a housing of constant radius, to the level of the exit stream (A). By flattening the exit housing at the exit as shown in FIG. 9, the level of the center of gravity of the fluid (D) contained in the bottom baffle is lowered relative to the level of the exit stream (C).

FIG. 10. This Figure portrays the design of a bulb shaped entrance utilized a siphon feed technique. This depicts a varying radius of the housing along the axis. A siphoning mechanism at the entrance to the device would allow for flexibility in height of a supply reservoir, simplification of fluid entry and the ability for the device to be located in a position not directly adjacent to the supply reservoir.

FIG. 13. This Figure portrays a 3 dimensional view of the preferred embodiment of the device. Optional areas open at the exterior of the helical baffle (A) allow for a leakage of fluid from the chambers to accomplish drainage into the next lower chamber.

DETAILED DESCRIPTION

Figure 13:
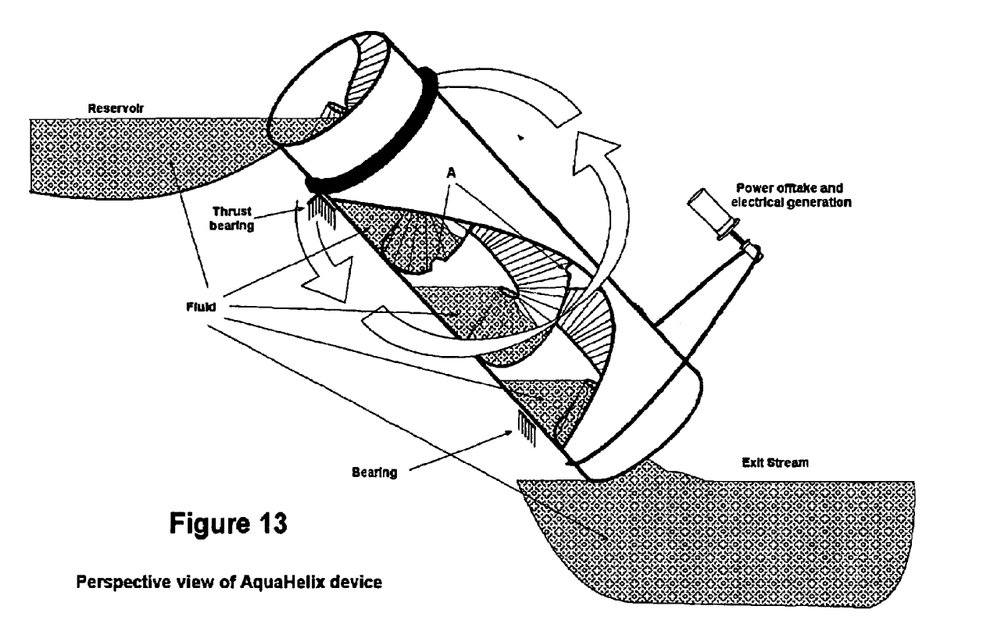
Figure 14:
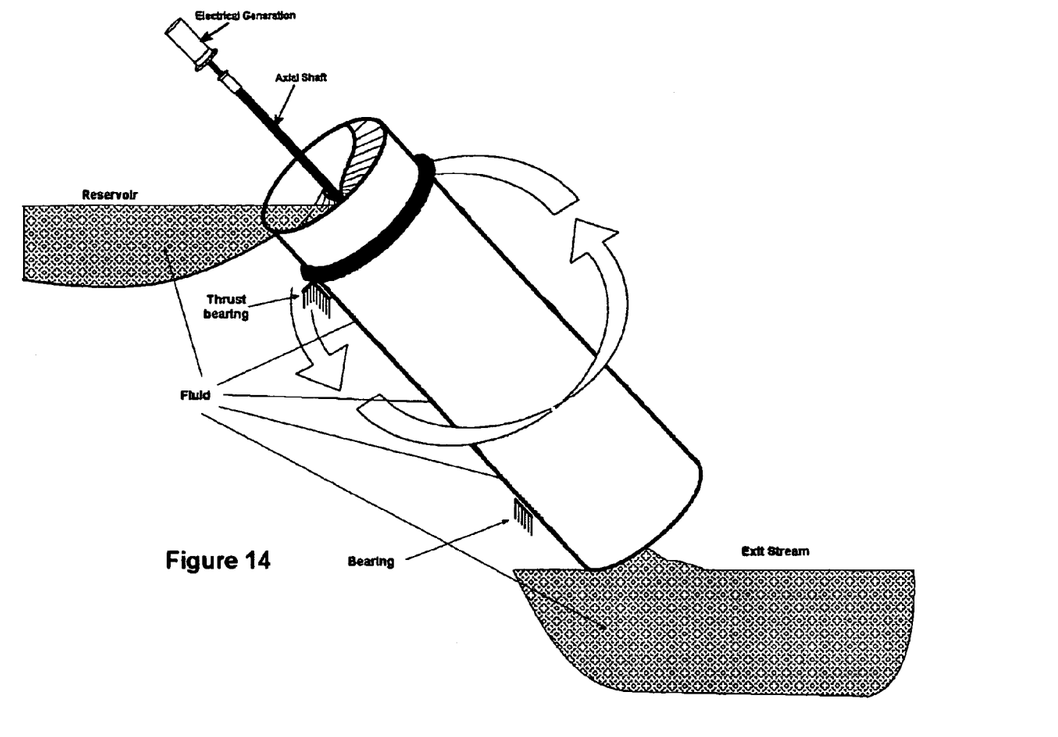
FIG. 14. This Figure depicts the optional power take off by axial shaft at the center of the housing and the preferred embodiment of electrical generation.

A helical baffle is enclosed in a generally cylindrical housing such that when the device is oriented on an angle, that open cavities capable of holding a volume of fluid are created in each of the helical turns between the baffle and the interior walls of the cylinder as depicted in FIG. 13. As the laws of physics allow that in a steady state situation, fluid pressure applied to a surface acts perpendicular to a tangent of that surface. That portion of the fluid contacting the helix will result in a moment of force around the axis of the cylinder and a component of force in the downward axial direction. A component of force will also be developed in the radial direction if a helical profile is utilized that is non-perpendicular to the axis of the housing. The remainder of the fluid will act on the walls of the cylinder creating additional forces in radial directions. As both radial and axial motion will be constrained by the housing and a thrust bearing, no energy will be extracted from the fluid from these components of force. The remaining rotational or moment forces will result in rotation of the helix and housing. As the rotational speed is kept relatively low in this device, it will approach steady state conditions as the magnitude of frictional and kinetic forces of the water will be low compared to those forces described above. Said otherwise, the frictional drag of the fluid against the baffle and housing walls will be small as compared to the forces generated by the pressure of the fluid. The resulting force vector will cause the assembly to turn about the cylinder's axis when adequate bearings or other friction reducing mechanism is utilized to allow the device to rotate. The axial vector of force of the fluid as well as the weight of the device itself will simultaneously create a tendency for a downward movement along the cylinder's rotational axis and therefore will require some form of constraint such as a thrust bearing to constrain axial movement.

Mechanical energy can then be extracted from the rotation of the device either by gearing, belts, frictional or other means from the surface motion of the outside of the housing, or by an axial off take thru the middle of the structure or by other means. This mechanical energy can then be utilized as desired as an energy source for subsequent operations such as electrical generation.

The improved efficiency of this device verses conventional turbines is derived primarily from the decreased kinetic energy present in the discharge of the fluid and from decreased viscous frictional losses. The basic mechanism of most devices in the hydroelectric realm (a principle focus of this invention) is the conversion of energy from potential energy, mass (water) at an elevation, to residual potential energy, mass at a lower elevation and mechanical energy that can be harnessed and utilized typically for the production of electricity. The efficiency of the conversion to mechanical energy is dependent on the amount of energy lost to other unharnessed forms specifically frictional energy and kinetic energy of the fluid at discharge. Frictional energy ultimately shows itself as heat, either in the mechanism, the air or in the fluid. Kinetic energy is attached to and wasted in the form of mass in motion of the fluid at the discharge of the device. The relative magnitude of energy in each of these forms is calculated below and is instructive to see the potential savings of the described device. As the speed of revolution of the device is slowed to approach 0, so does the loss to kinetic energy and the loss to viscous friction (heat gain) of the fluid. The calculation below is instructive as to the magnitude of potential gains from the device. The calculations below demonstrate that in a typical hydroelectric turbine installation, that for every 100 tons of water and every 100 foot of elevation, there exist the potential energy of 7.53 Kilowatt-hours of energy. With a typical discharge water speed of 20 miles per hour, 1.01 Kilowatt-hours of energy is wasted in the form of kinetic energy and with a $\frac{1}{10}$ degree Fahrenheit increase in temperature an additional 1.48 Kilowatt-hours of energy is consumed to heat the water and cannot be captured for productive use. This results in a maximum potential capture of energy of 5.04 of the original 7.53 Kilowatt-hours of energy or 67% efficiency. The device described herein has materially less exit fluid velocity and shearing friction resulting in fluid heating. The result is a potential increase in overall efficiency of up to 49% ($\frac{33}{67}$) from the energy lost it in exit velocity and temperature alone The potential energy in 100 tons of water at 100 fit is 7.53 KW-hours as calculated below:

Joules (energy)=mass in kg*9.81 m/sec2 (gravity) *height in m 100 tons*907.185 kg/ton=90718.5 kg 100 ft*0.3048 m/ft=30.48 m Substituting: 90718.5 kg*9.81 m/sec2*30.48 m=27,126,000 Joules 27,126,000 Joules/3,600,000 Joules/KW-hour=7.53 Kilowatt-hours The kinetic energy in 100 tons of water traveling at 20 mph is 1.01 KW-hours as calculated below:

Joules(energy)=½*mass in kg*(velocity in m/s)**2

100 tons*907.185 kg/ton=90718.5 kg 20 mph*(0.44704(meters/sec)/mph)=8.9408 m/s

Substituting: ½*90718.5 kg*(8.9408 m/s)**2=3,626,000 joules 3,626,000 joules/(3,600,000 Joules/KW-hour)=1.01 Kilowatt-hours 100 tons of water raised 0.1 degree Fahrenheit from viscous friction absorbs 1.48 Kilowatt-hours of energy Gram-degree C.(energy)=mass(grams)*change in Temp.(degree C.)

100 tons*907,184 grams/ton=90,718,400 grams 0.1 degree F.*5/9 degree C./degree F.=0.055556 Degree C.

Substituting: 90,718,400 grams*0.055556 Degree C.=5,039,951 gram-degree C.

5,039,951 gram-deg C.*0.29307 watt-hr/BTU=1,477,058 watt-hrs 1,477,058 watt-hrs=1.48 KW-hrs While a 20 mph discharge speed and 0.1 degree F. discharge water temperature gain are crude estimates of typical turbine hydroelectric installations, the benefit of reductions in these areas are significant, the combined losses of 2.49 Kilowatt-hours being ⅓ of the potential energy (7.53 Kilowatt-hours) that could be obtained. The temperature change, while real in concept has the further complication of an evaporative cooling effect that becomes significant in the turbulent discharge of traditional hydroelectric dams where portions of the wasted kinetic energy hasten evaporative heat transfer and result in re-cooling the water, potentially cooler than the entrance temperature. However, despite this countering effect on the water temperature, the viscous loses due to high turbulence and turbine shear are no less wasteful in traditional hydroelectric turbine technology. As the size of the AquaHelix carrying a given volume increases the rpm of the device decreases and as the rpm approaches zero the kinetic and viscous frictional loses also approach zero. An optimization of the higher cost of construction and the frictional loses in the larger device itself countered by the lower kinetic and viscous frictional loses would be utilized to size the device and determine the optimal operating rpm.

Figure 1:
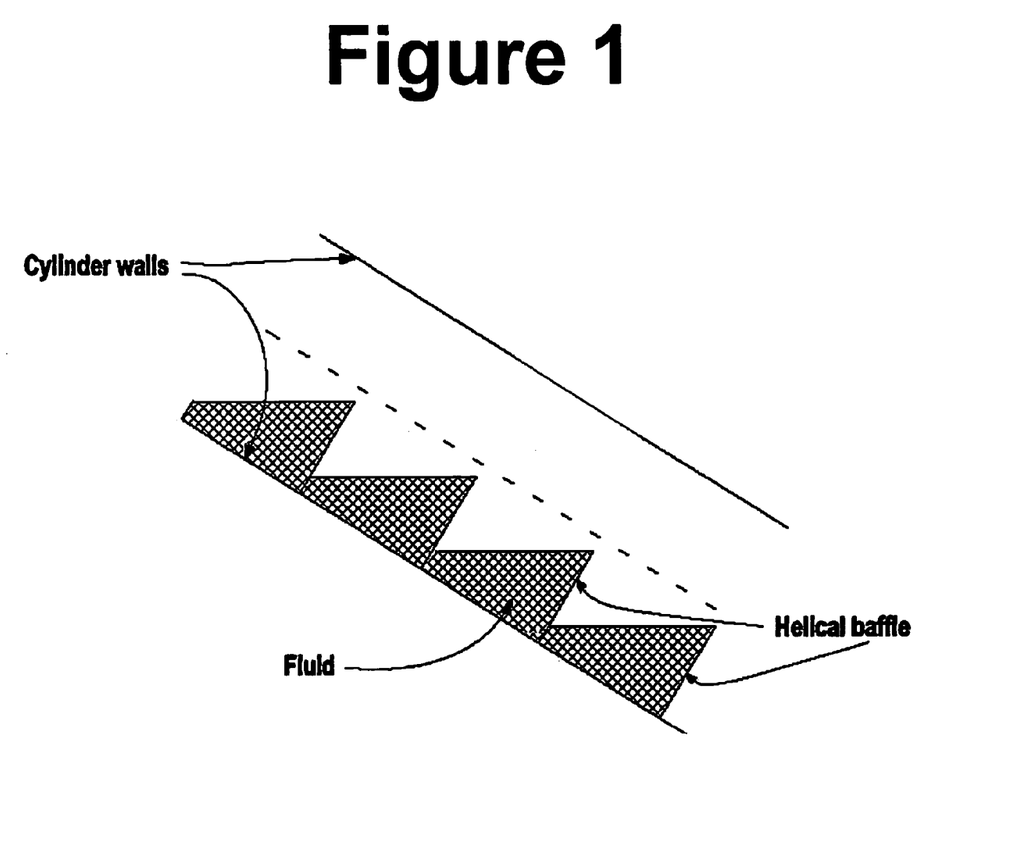
FIG. 1. This Figure along with FIG. 2 portrays the effect of larger and smaller helix pitch on the volume of liquid in the device. Smaller pitch results in higher volume. By decreasing the pitch, as shown in FIG. 2, more turns per unit length, the amount of fluid contained in the device is increased. The additional volume is shown with the differientiated hatch pattern in FIG. 2.
Figure 2:
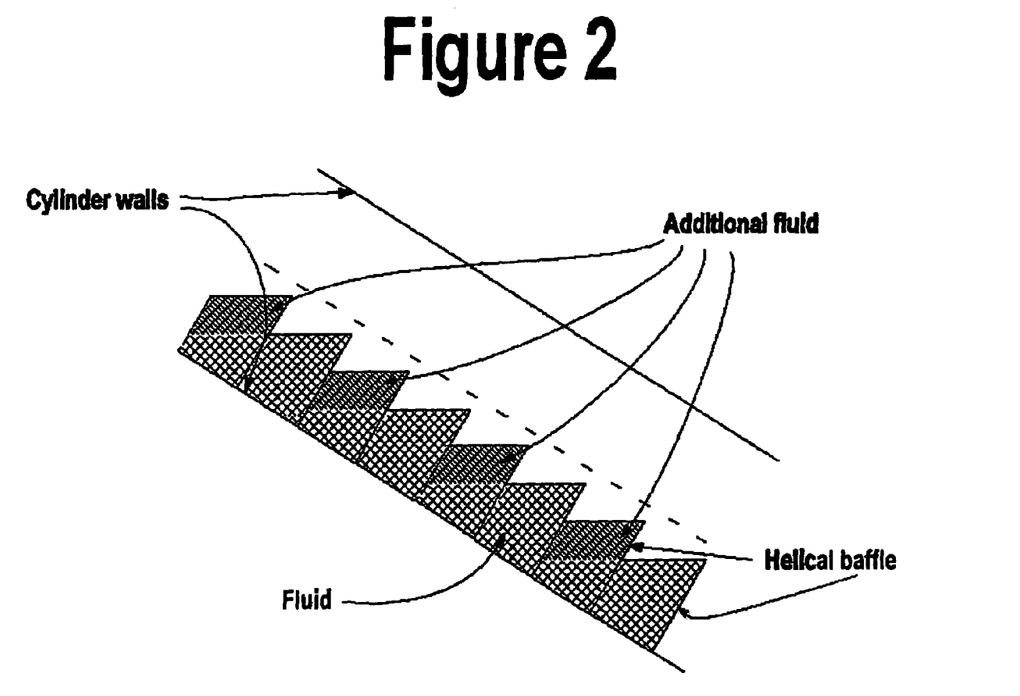
Figure 3:
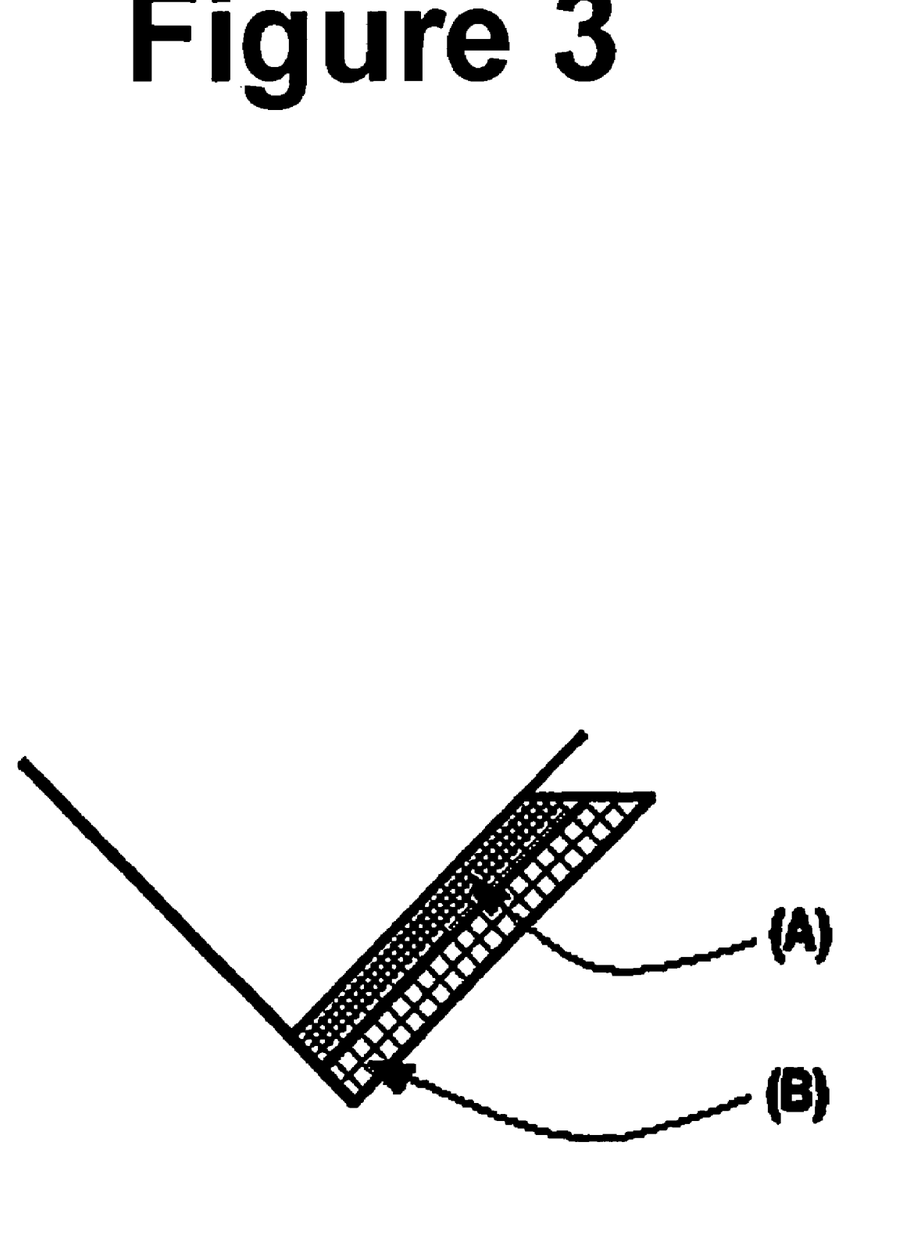
FIG. 3. This Figure portrays the effect of larger and smaller helix pitch on the spill effect at the exit of the device. Smaller pitch results in less potential energy loss at discharge. The figure shows an area (B) representing the cross section of fluid for a given pitch which will be spilled at the exit of the device. If the pitch was doubled additional fluid (A) would be added. As the center of gravity of the additional fluid (A) is higher, the average potential energy lost at the exit spill with a larger pitch is greater.
Figure 4:
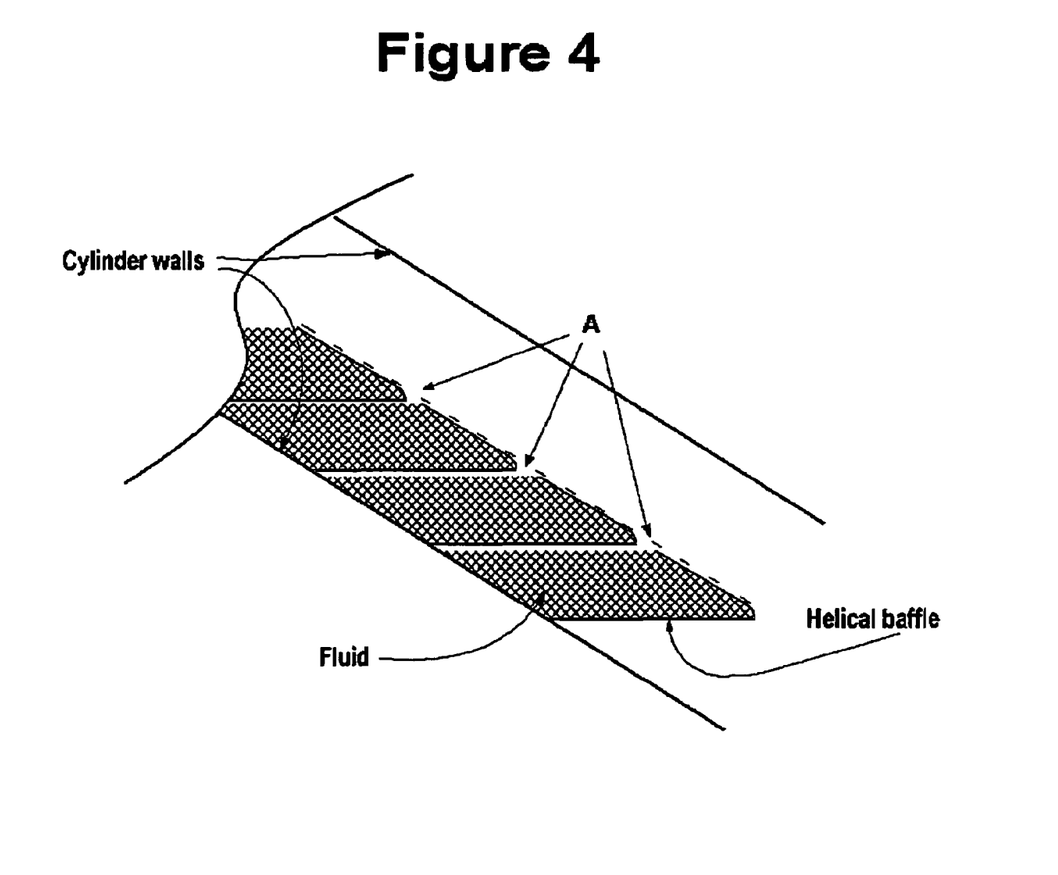
FIG. 4. This Figure depicts a baffle cross section with a high volume of water captured in a helix turn. By varying the cross sectional design of the baffle, the amount of fluid contained in the housing can approach ½ the volume of the housing. Optional areas open at the center of the helical baffle (A) allow for a leakage of excess fluid over the baffle into the next lower chamber.
Figure 5:
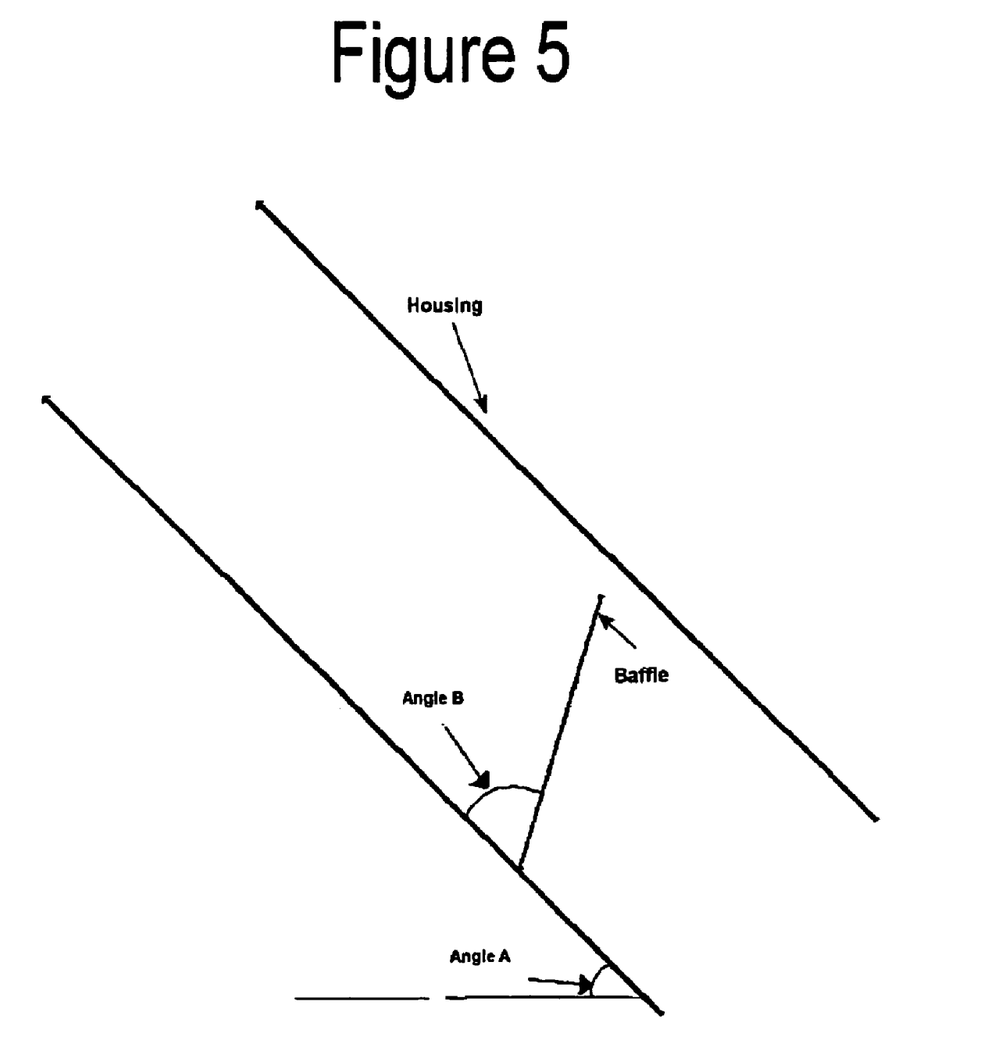
FIG. 5. This Figure portrays a baffle cross section with low surface area of the baffle in contact with the fluid. For a given housing angle from horizontal (A) and a simple helix cross-section, there exists an optimal angle between the baffle and housing (B) to maximize the ratio of fluid volume to frictional surface.
Figure 6:
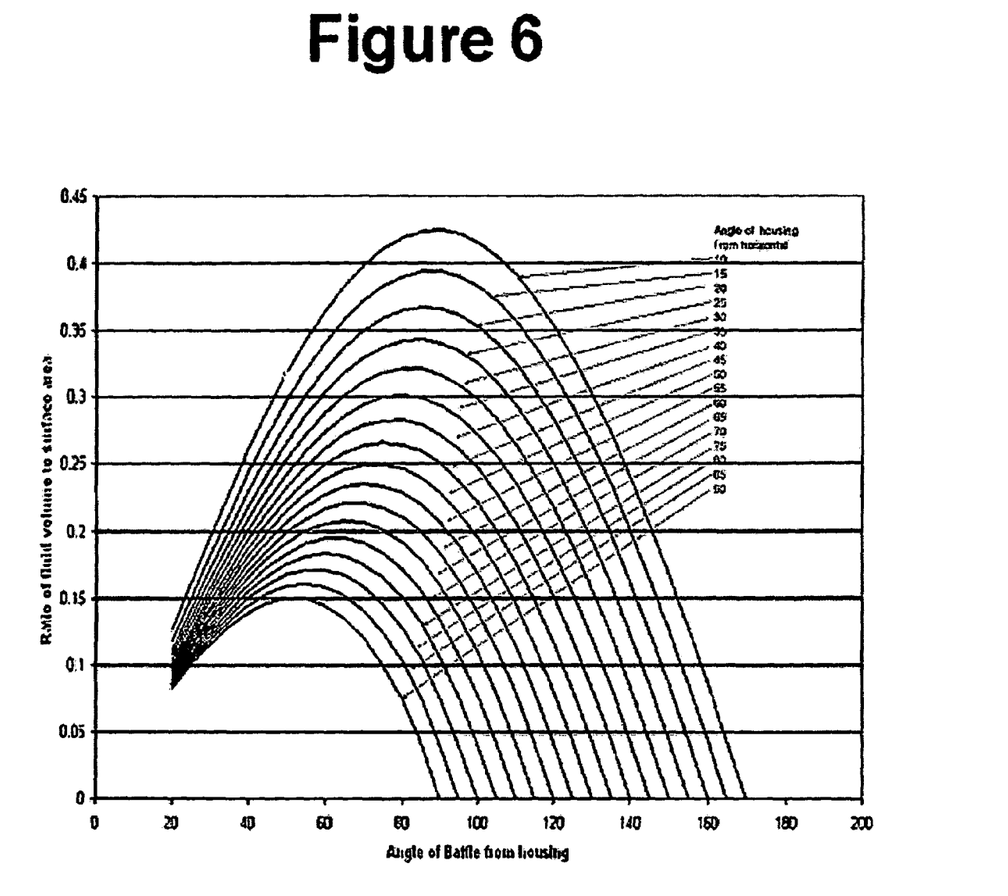
FIG. 6 provides these ratios for various housing and baffle angles.

The helix pitch of the baffle can also be optimized to maximize the net power obtained. This would be accomplished by lab modeling and measurement of the net rotational energy obtained from various pitches for a given fluid and housing diameter. As the helix pitch is decreased, more turns, the total fluid volume and therefore conversion potential contained in the device at any point in time would increase (See FIG. 1). In addition the lost potential energy due to the spilling effect at the exit would also be reduced (See FIG. 3). However, as the helix pitch is decreased surface area exposed to a given amount of fluid is increased and therefore the viscous frictional losses are larger. Weight of a lower pitch device would also be increased and thereby increasing the losses to friction in the rotational and thrust bearing surfaces. The optimal pitch will be a function both of the fluid characteristics and the diameter of the housing as well as the cross section of the baffle discussed below The cross section of the baffle can also be optimized to maximize the net power obtained. This would be accomplished by optimizing the baffle design to carry more fluid per turn of the helix versus the viscous fluid losses of various cross sections. A cross section with base parallel to the fluid surface (horizontal) and a minimal interior radius would increase fluid per turn of the helix (See FIG. 4). However, the ratio of fluid volume to surface in contact with the housing and baffle can also be optimized for various angles of the baffle (See FIG. 5). The optimal design will be a compromise between these two extremes that provides the maximum net power obtained for a given fluid and housing characteristics. The exact profile of the baffle will be optimized through lab and prototype experimentation.

Figure 7:
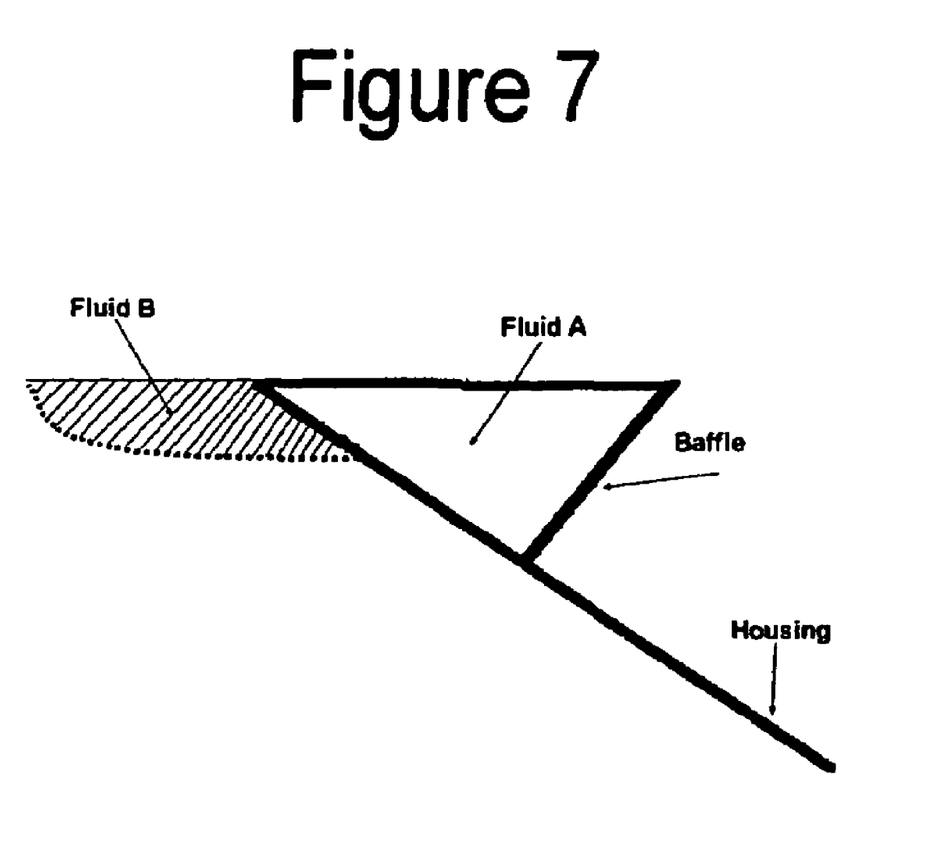

The radii of the housing as well as the radii and pitch of baffles may vary along the axial length of the device in order to further optimize the conversion of energy or for physical design considerations, for example:

1. The top, input end of the device may be of increased radius and helix pitch in order to better accept the inflow of fluid. With a larger radius and pitch fluid can be entered more easily and the average "drop" of fluid which wastes energy to kinetic and heat forms can be minimized as the depth of the fluid going into the device would be lessened (See FIG. 7) thus reducing loss potential energy associated with introduction of fluid into the device.

Figure 8:
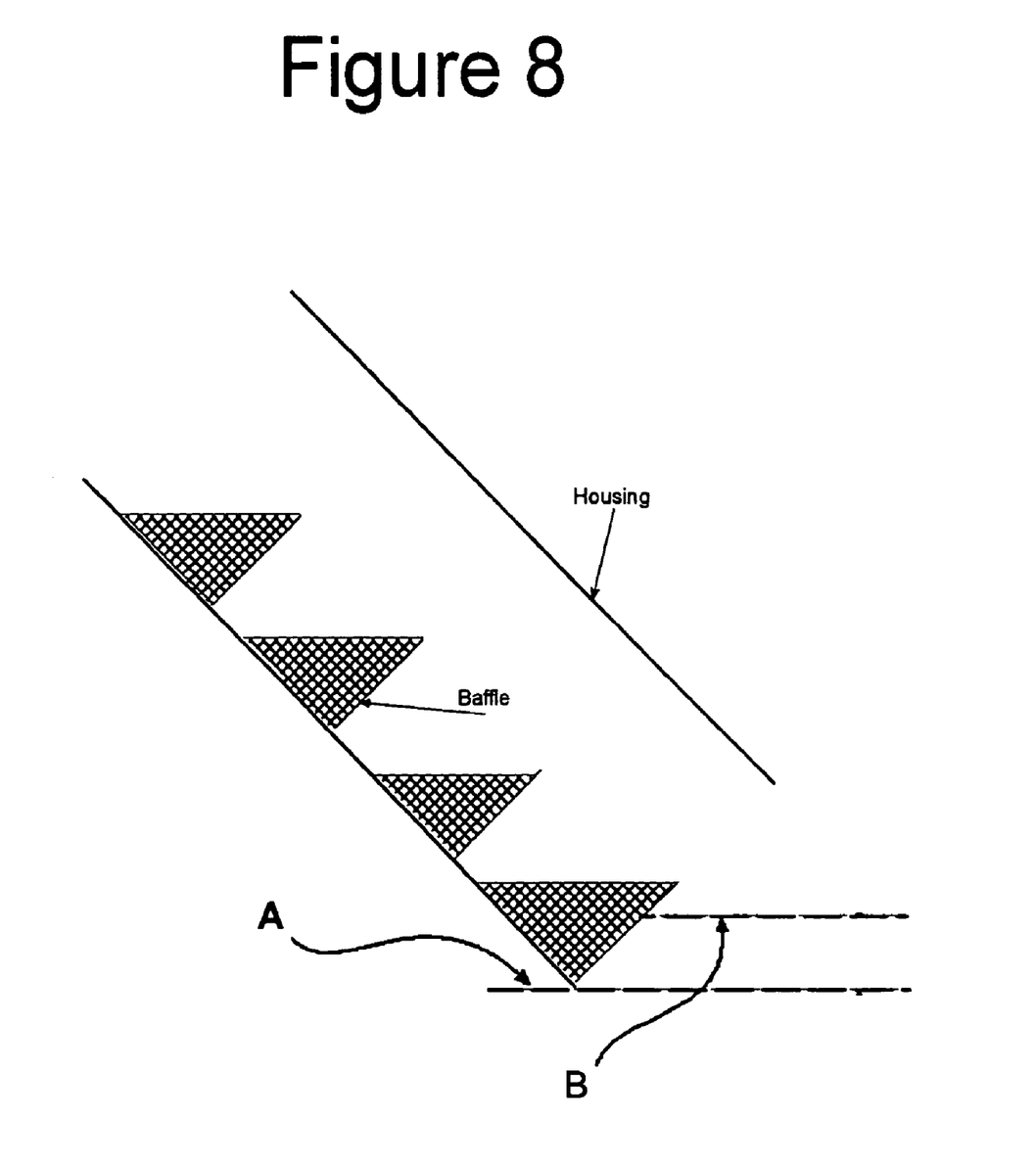
FIG. 8. This Figure along with FIG. 9 portray the effect of larger radius and helix pitch at the exit of the device.
Figure 9:
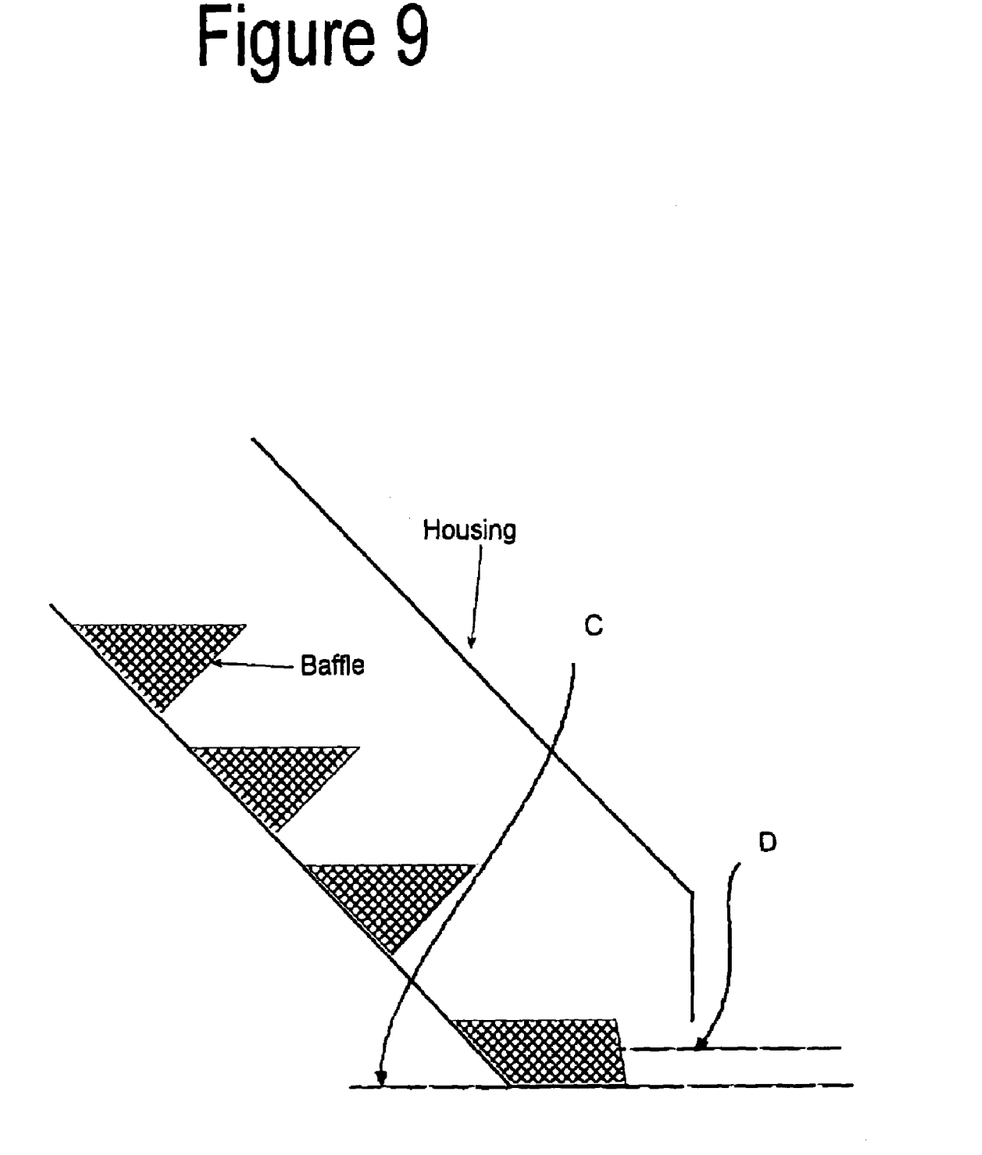

2. The bottom, exit end of the device, may also be increased in diameter and pitch to decrease the inefficient spill at the exit as well as extracting some of axial direction kinetic energy from the fluid by slowing the exit velocity (See FIG. 8).

Figure 10:
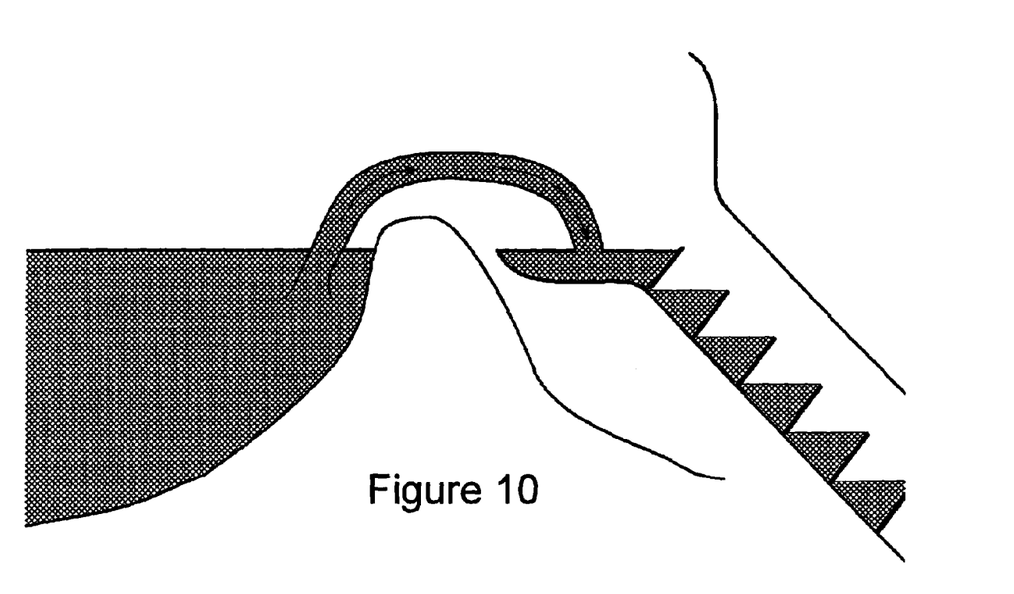

3. A bulb shaped top, input end, may also be utilized with a siphoning configuration to provide for an effective sealing effect between the source of the fluid and the conversion device (See FIG. 10). This concept has potential additional advantages of allowing the supply reservoir to be somewhat remote from the device. This could potentially be upstream of an area of rapids where the accumulated elevation fall is adequate for power generation but where no individual "fall" is of sufficient elevation. The configuration would also lend it self to adjusting for changes in the supply reservoir elevation such as when it may become lower than the entrance of the housing.

Figure 11:
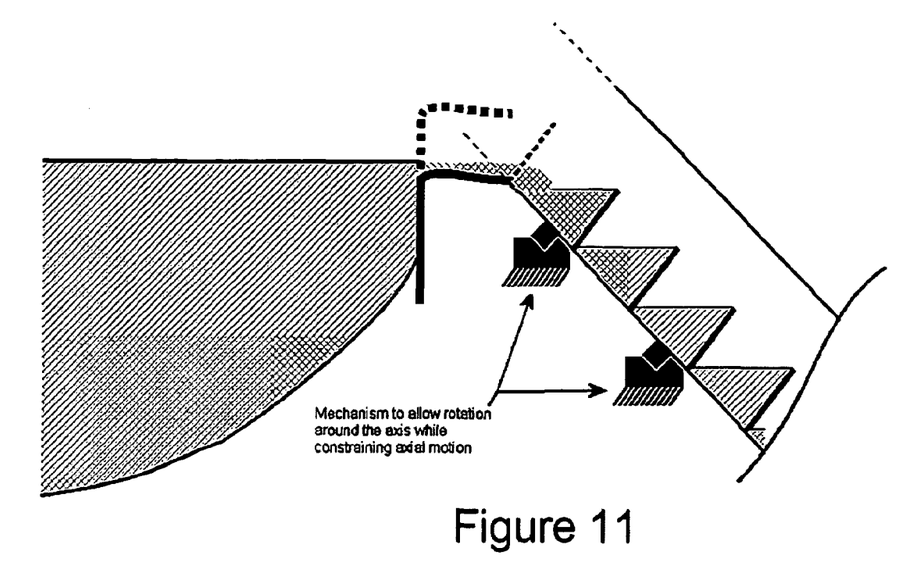
FIG. 11. This Figure portrays the change in input elevation via shortening or lengthening of the device and a typical mechanism to allow rotation around the axis while constraining axial motion.
Figure 12:
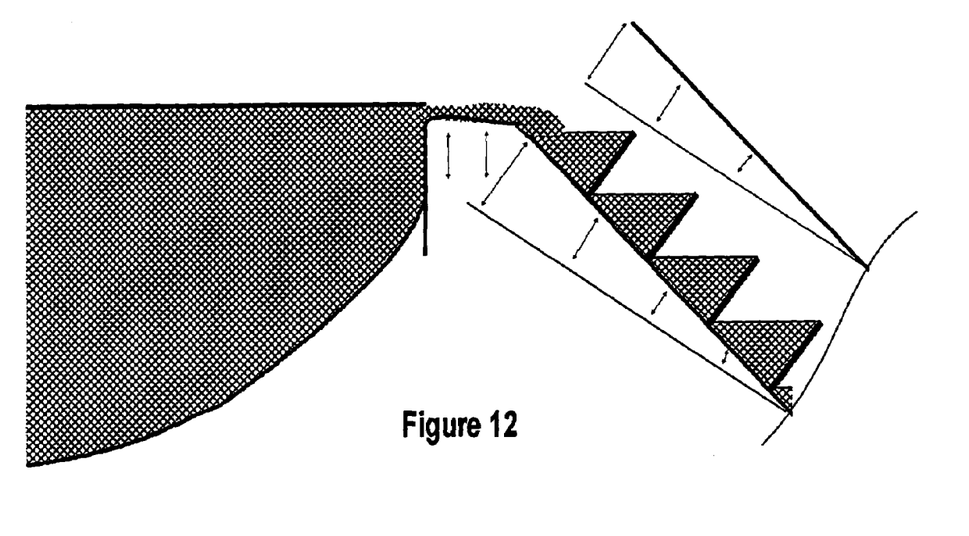
FIG. 12. This Figure portrays the change in input elevation via changing the angle of the device.

The input elevation can also be adjusted by shortening or lengthening the input end of the device, (see FIG. 11) or by changing the angle of the device, (see FIG. 12). This may be desired to accommodate optimal entry of the fluid as the level of fluid in the supply reservoir may vary.

As stated in several of the discussions of the invention detail above, the viscous friction between the surfaces of the housing and baffles with the fluid results in waste. Consequently a surface treatment to minimize friction will be important to address as will the consistency of the geometry of the fluid chamber as the device turns. The discussions of advantage from varying radii and helix pitches above will need to be optimized against these countering losses as both viscous friction and turbulence from changes in geometry will result in efficiency losses.

At the center of the device along the axial length the baffles may be left open to allow overflow from one chamber to the next. This will provide a self-priming nature to the device. As fluid is entered into the first baffle area, in the event that the torque generated is not adequate to begin rotation of the device when the chamber becomes full, the fluid will then spill over to the subsequent chamber, and so on, until adequate torque is developed. Relatively small seepage holes may be utilized at the circumference to accomplish drainage of the device when it is not in operation.

Appendix Data

Definitions Appendix A

Generally cylindrical—Describes a housing with radial symmetry but where the radius measurement may vary along the axial length. I.e., the housing may include tapers, bulges etc.

Helical baffles—Describes a fin-like construction from the inside of the housing toward the axis of the housing. The baffles will be generally sealed to the housing however some weep holes, access points etc. may be incorporated. A version whereby the baffles are semi-sealed but not physically connected to the housing is also claimed. The pitch of the helix may be varied along the axial length of the housing. The profile of the baffle (the cross section formed by a plane containing the housing axis and any radius) may be of a curved nature to maximize the fluid capacity, minimize frictional losses, fluid turbulence or otherwise improve the efficiency of the device.

AquaHelix—Proprietary term, September 2003 search indicates it is not US Copyrighted as of that time, used to describe the mechanism contained in this patent.

Sealed—The term sealed shall be taken to mean allowing minimal leakage of a fluid barrier in relation to the volume of fluid associated with the device. While the seal will generally be accomplished by solid materials, other form of seals allowing relative motion of portions of the barrier may be utilized and some degree of leakage may be expected or intentionally designed.

I claim:

1. A device utilizing a helical baffle contained in a generally cylindrical housing;
said helical baffle is sealed at the exterior radius and open or sealed at the interior radius;
said generally cylindrical housing is positioned at an angle of >0 and <90 degrees from horizontal;
the housing being supported by a thrust bearing allowing rotation around the axis of the housing while constraining axial motion;
with a mechanism of mechanical transfer from the housing to off take rotational kinetic energy for productive use;
whereby a fluid is introduced in to the high end of the housing/baffle assembly and while causing rotation of the housing and baffle is conveyed to the lower end and discharged; thus extracting potential energy and converting same to kinetic and frictional energy.

2. The device described in claim 1, wherein the design of the baffle allow a leakage at the center radius to accomplish priming of the device such that prior to beginning of rotation and during startup, the fluid in higher baffle chambers can spill over into lower baffle chambers until adequate torque is generated to initiate rotation of the housing.

3. The device described in claim 2 wherein the design of the baffle allows a small leakage at the exterior radius to accomplish draining of the device over an extended period of time when out of operation.

4. The device described in claim 1, 3 or 2 wherein the housing is shaped in a cylindrical like structure of varying radii along the axis in order to maximize energy conversion from potential fluid energy to rotational kinetic and mechanical energy while minimizing losses due to frictional effects and kinetic energy of the fluid at the points of intake and discharge.

5. The device described in claim 1, 3 or 2 wherein the method of rotational mechanical energy off take is accomplished by an axial shaft at the center of the housing.

6. The device described in claim 1, 3 or 2 wherein the method of rotational mechanical energy off take is accomplished by a mechanical transfer from the exterior of the housing.

7. The device described in claims 1, 3 or 2 wherein a bulb shaped housing at the top, entrance end of the device is utilized with siphoning supply piping to accomplish fluid transmission from a supply of water to the device.

8. The device described in claims 1 or 3 wherein energy is applied to the housing and baffle assembly in an opposite direction to the natural force of fluid on the helix, thereby creating a lifting device to move the fluid from a lower to higher elevation.

9. A device utilizing a helical baffle contained in a generally cylindrical housing;
said helical baffle is sealed at the junction of the helical baffle and the cylindrical housing but allowing the helical baffle to rotate relative to the housing and open or sealed at the interior radius;
said generally cylindrical housing is positioned at an angle of >0 and <90 degrees from horizontal;
the baffle being supported by a thrust bearing allowing rotation around the axis of the housing while constraining axial motion;
with a mechanism of mechanical transfer from the baffle to off take rotational kinetic energy for productive use;
whereby a fluid is introduced in to the high end of the housing/baffle assembly and while causing rotation of the baffle is conveyed to the lower end and discharged; thus extracting potential energy and converting the same to kinetic and frictional energy.

10. The device described in claim 9 wherein the design of the baffle to housing seal allows a small leakage at the exterior radius to accomplish draining of the device over an extended period of time when out off operation.

11. The device described in claim 9 wherein the design of the baffle allow a leakage at the center radius to accomplish priming of the device such that prior to beginning of rotation and during startup, the fluid in higher baffle chambers can spill over into lower baffle chambers until adequate torque is generated to initiate rotation of the housing.

12. The device described in claim 9, 10 or 11 wherein the housing is shaped in a cylindrical like structure of varying radii along the axis in order to maximize energy conversion from potential fluid energy to rotational kinetic and mechanical energy while minimizing losses due to frictional effects and kinetic energy of the fluid at the point of discharge.

13. The device described in claims 9, 10 or 11 wherein a bulb shaped housing at the top, entrance end of the device is utilized with siphoning supply piping to accomplish fluid transmission from a supply of water to the device.

14. The device described in claims 9, 10 or 11 wherein energy is applied to the baffle assembly in an opposite direction to the natural force of fluid on the helix, thereby creating a lifting device to move the fluid from a lower to higher elevation.

* * * * *